OR    4,009,931

United States Patent
Malsby et al.

[11] 4,009,931
[45] Mar. 1, 1977

[54] OPTICAL WAVEGUIDE CONNECTOR

[75] Inventors: Marc W. Malsby, Lake Arrowhead; Kenneth M. Clark, Beaumont, both of Calif.

[73] Assignee: The Deutsch Company Electronic Components Division, Banning, Calif.

[22] Filed: May 8, 1975

[21] Appl. No.: 575,977

Related U.S. Application Data

[62] Division of Ser. No. 452,837, March 20, 1974, abandoned.

[52] U.S. Cl. ............................ 350/96 C; 350/96 B
[51] Int. Cl.² .......................................... G02B 5/16
[58] Field of Search ........... 350/96 C, 96 B, 96 BC, 350/96 WG

[56] References Cited
UNITED STATES PATENTS 3,455,625    7/1969   Brumley et al. ............... 350/96 C
3,846,010   11/1974   Love et al. .................... 350/96 C

*Primary Examiner*—John K. Corbin
*Assistant Examiner*—Stewart Levy
*Attorney, Agent, or Firm*—Gausewitz, Carr & Rothenberg

[57] ABSTRACT

A connector for optical fibers including in each connector section a shell containing a ferrule having an opening receiving a plurality of optical fibers positioned in abutting relationship in predetermined locations, one of the connector sections including a rotatable member coupled to the other connector section for selectively rotationally adjusting the positions of the mating connector sections so as to optimize alignment of individual glass fibers in the two connector sections. The optical fibers of each connector section are assembled in the ferrule and shell before being finished to present a collective flat perpendicular end surface at a predetermined location.

4 Claims, 14 Drawing Figures

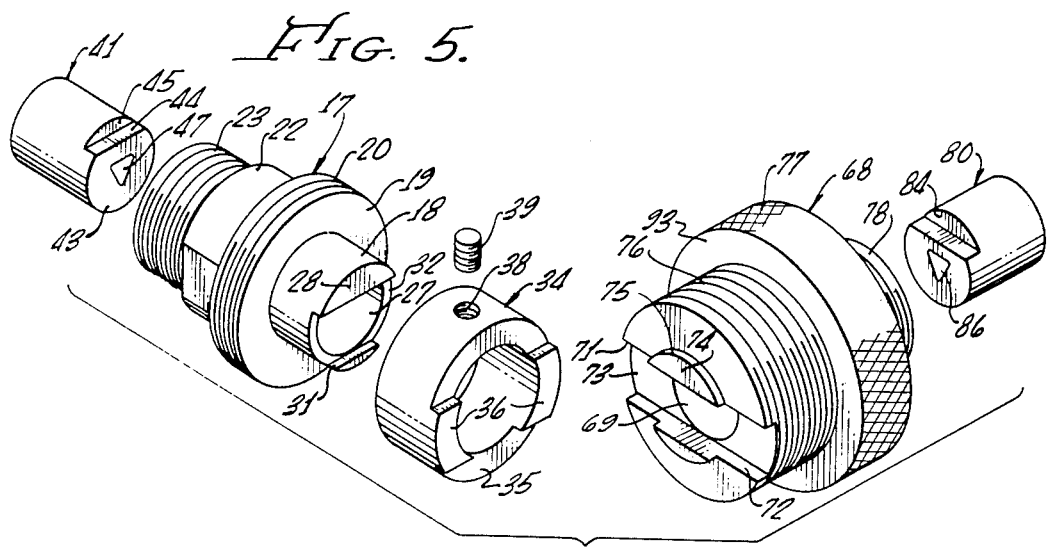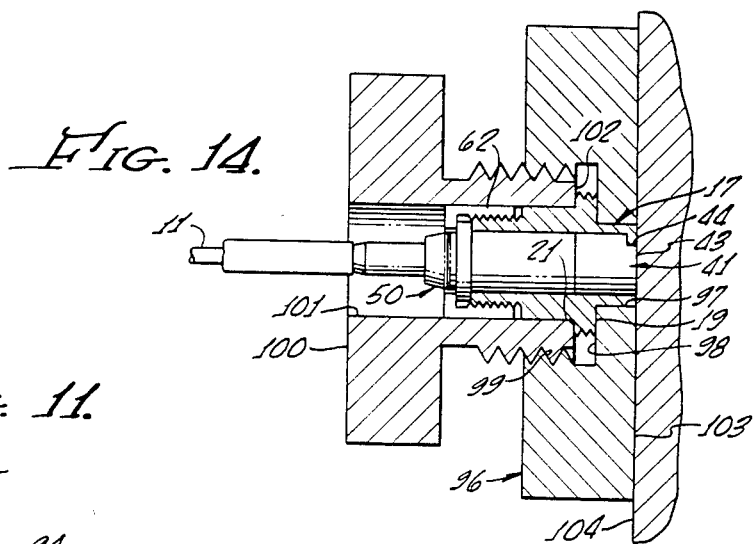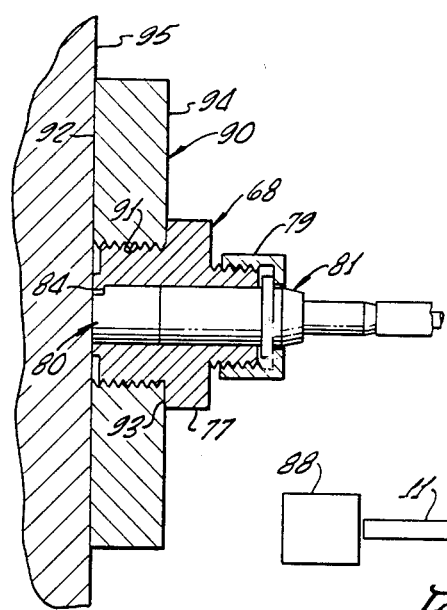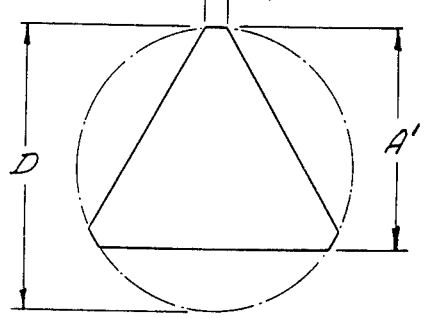

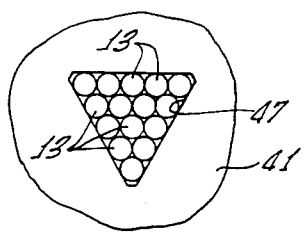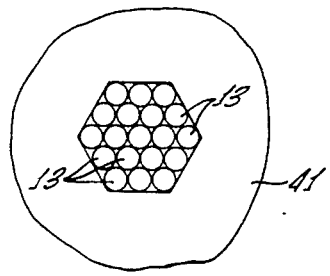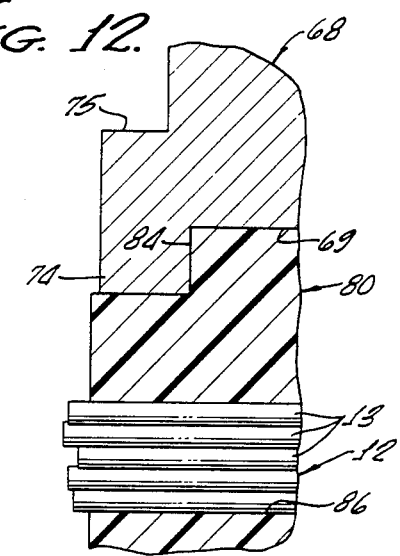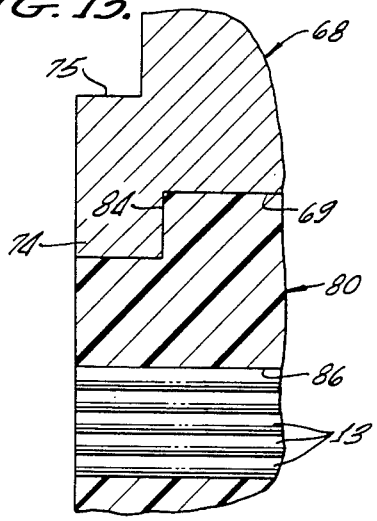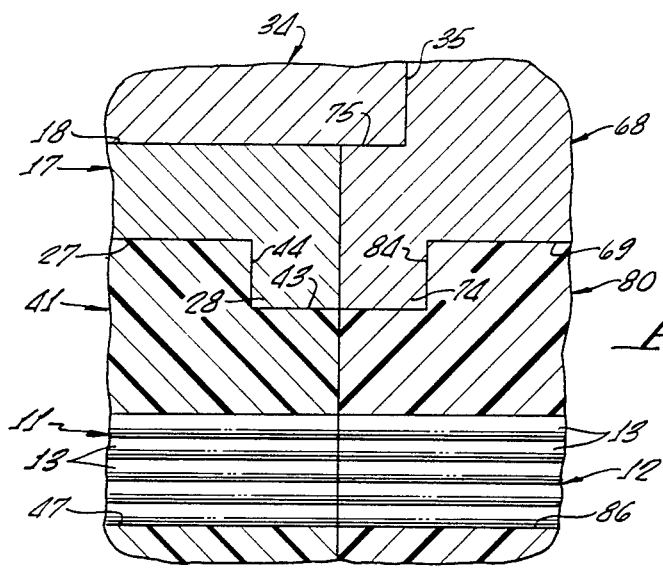

OPTICAL WAVEGUIDE CONNECTOR

This is a division, of application Ser. No. 452,837, filed Mar. 20, 1974 now abandoned.

BACKGROUND OF THE INVENTION

1. Field of the Invention

This invention relates to a connector for bundles of optical fibers.

2. Description of Prior Art

In the transmission of information, glass optical waveguides offer many advantages over conventional conduction of electrical signals in metal wires. A system of optical fibers can be made to have a much greater capacity in a given volume than that of an electrical system. Additionally, optical fiber systems have economies of manufacture and are less susceptible to moisture as well as being unaffected by temperature changes and electrical disturbances.

In an optical waveguide system, the waveguides are arranged in bundles which must be interconnected to transmit signals appreciable distances. In transmitting signals of practical values, it is important that the connections between the fibers minimize light attenuation. Ideally, glass fibers to be connected are given radial end faces positioned in abutment and in precise alignment. In an effort to accomplish this, it has been proposed to group the fibers in a channel appropriately dimensioned and shaped to cause the individual fibers to assume known positions. When placed in a hexagon or other channel congruent with the axis, the optical fibers can be made to fit in an abutting relationship with each other and the walls of the channel, entirely filling the channel, which thereby positions the fibers in predetermined locations. By placing one channel in end-to-end relationship with the other, the optical fibers thereby are connected.

However, in such connectors there has been an inability to properly align the hexagonal channels so as to achieve an acceptable degree of axial alignment of the individual fibers. Light attenuation has been relatively high. Other difficulties are found in preparing the ends of the fibers in the bundles so that they are flat, perpendicular to the axis and aligned radially. Such problems have resulted in losses so great that a connector of this design is not usable in a practical system of information transmission.

SUMMARY OF THE INVENTION

The present invention provides an improved connector for optical fibers which has an adjusting means to permit fiber alignment to be accomplished with precision. The connector is in two sections, a plug and receptacle, which are held together by a coupling nut when in the mated position. Each of the connector sections includes a shell within which is a ferrule defining an opening of triangular, hexagonal or other appropriate shape to receive the glass fibers in abutting relationship in predetermined positions. Rearwardly of the ferrules are elongated members which held align the fibers with the openings in the ferrules and provide support for them to avoid breakage. The ferrules are held against rotation relative to their shells.

On the exterior of the plug shell at its forward end is a rotatable ring having lugs at its forward end. A set screw extends through the wall of the ring to engage the surface of the plug shell to selectively lock the ring against rotation relative to the plug shell. The lugs of the ring fit complementarily within a slot on the forward end of the receptacle shell. Therefore, by rotating the ring relative to the plug shell, the receptacle also is caused to rotate relative to the plug. This rotates the bundle of fibers within the receptacle relative to the bundle of fibers in the plug so that they may be adjusted to achieve the best possible alignment. The ring is held in its adjusted position by the set screw so that the optimum setting will be retained. In this manner, light attenuation is reduced significantly, and the connector may be coupled repeatedly without changing its characteristics.

The fiber bundles of the connector of this invention have collective end surfaces which are flat and perpendicular to their axes, as well as being positioned substantially in abutment when the connector is mated. This is accomplished by finishing the ends of the bundles after assembly of the bundles and the other principal components of the plug and receptacle. For each connector section there is a fixture which positions the end of the bundle on a polishing surface to allow the bundle to be finished to the proper angle and position. By being finished following assembly of the fiber bundles into the connector sections, better alignment of the fiber ends is achieved and the relative positions of the fibers and the connector components are not disturbed afterwards. As the end of the fiber bundle is finished, the ends of the ferrule and the shell of the connector component also are finished to the same plane. This facilitates positioning the ends of the fiber bundles in abutment when the connector is mated, while also abutting the ends of the plug and receptacle shells. The principal compression loads between the plug and receptacle then will be transmitted through the plug and receptacle shells rather than the optical fibers.

BRIEF DESCRIPTION OF THE DRAWING

FIG. 5 is an exploded perspective view of components of the connector;

FIG. 6 is an enlarged fragmentary end elevational view of a ferrule with the optical fibers occupying predetermined positions therein;

FIG. 7 is a view similar to FIG. 6, but of a modified ferrule leaving a hexagonal opening;

FIG. 8 is a schematic view of a triangular opening for a fiber bundle as used in computing the dimensions of the opening;

FIG. 9 is a side elevational view of the testing arrangement for accomplishing rotational adjustment of the plug and receptacle;

FIG. 10 is an enlarged fragmentary sectional view showing the end-to-end alignment of the fibers of the two bundles within the connector;

FIG. 11 is a longitudinal sectional view of the arrangement for polishing the end of the receptacle shell, its ferrule and optical fiber bundle;

FIG. 12 is an enlarged fragmentary longitudinal sectional view of the end portion of the receptacle shell, ferrule and optical fiber bundle prior to the polishing operation;

FIG. 13 is a view similar to FIG. 11 after the polishing operation has taken place; and FIG. 14 is a longitudinal sectional view of the arrangement for polishing the end of the plug shell with its ferrule and optical fiber bundle.

Figure 1:
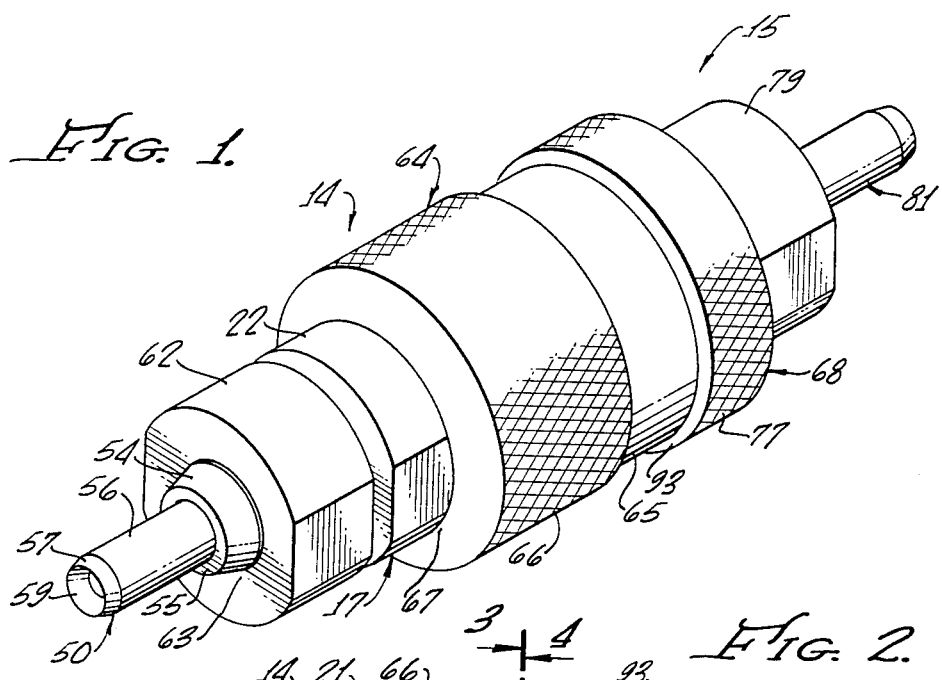
FIG. 1 is a perspective view of the connector of this invention.

DESCRIPTION OF THE PREFERRED EMBODIMENT:

The connector of this invention connects bundles 11 and 12 of discrete optical fibers together in an end-to-end relationship. It permits the individual fibers 13 of the two bundles to be aligned with precision so that their end faces are in registry and parallel, and there is minimal light attenuation where the connection is made.

The connector includes a plug assembly 14 with which the fiber bundle 11 is associated and a receptacle assembly 15 for the fiber bundle 12. The plug assembly includes a plug shell 17 of metal such as aluminum alloy. This is a tubular member having a forward end portion 18 of circular cross section and relatively small outside diameter which connects through a radial shoulder 19 to an exteriorly threaded portion 20 of relatively large diameter. The latter portion, through a radial shoulder 21, connects to a part 22 of intermediate diameter. The smaller rearward end 23 is externally threaded.

A bore extends through the plug shell 17, the bore having a rearward portion 26 which is longer and of slightly larger diameter than the forward portion 27 of the bore. A flange 28 extends across the upper edge of the outer end of the forward part 27 of the bore, as the device is illustrated, the lower edge of the flange 28 being chordal with respect to the bore. A transverse recess is formed in the forward end of the plug shell off-center from its longitudinal axis. The upper end of the recess is defined by the lower edge of the flange 28, but the lower edge 31 is radially outwardly of the bore 25. The inner surface 32 of the recess is radial with respect to the plug shell.

An alignment sleeve 34 complementarily fits around the forward portion 18 of the plug shell 17. The alignment sleeve 34 is slightly longer than the portion 18 of the plug shell 17 and on its radial forward face 35 includes opposed lugs 36 that extend axially outwardly, offset to one side of the longitudinal axis. These lugs have flat top and bottom edges that are parallel to the axis and flat outer surfaces in a radial plane. The rearward end 37 of the alignment sleeve 34 also is radial. A threaded opening 38 extends radially through the circumferential wall of the alignment sleeve and receives a set screw 39.

A ferrule 41, typically of plastic material, fits complementarily within the forward portion 27 of the bore of the plug shell 17. The exterior of the ferrule 41 is cylindrical, with the exception of a notch at the forward end 43 of the ferrule. The notch has a lower surface 44, as the ferrule is positioned in the drawing, which is chordal relative to the periphery of the ferrule and terminates at an inner radial surface 45. In the plug assembly, the inner radial edge of the flange 28 engages the surface 45 of the notch in the ferrule and the lower edge of the flange 28 is adjacent the transverse chordal surface 44 of the ferrule notch. This holds the ferrule 41 against forward movement relative to the plug shell 17, aligns the ferrule angularly relative to the plug shell and prevents relative rotation of the ferrule and plug shell.

The opening through the ferrule includes a forward portion 47 which is shaped as an equilateral triangle but with blunted corners and is of closely held dimensions. The rearward portion 48 of the opening through the ferrule flares outwardly and assumes a circular cross section adjacent the radial rearward end face 49 of the ferrule.

Rearwardly of the ferrule 41 is a fiber support 50 in the form of an elongated sleeve having a forward exterior cylindrical surface 51 that fits within the rearward bore portion 26 of the plug shell 17. The forward radial end 52 of the support 50 engages the rearward end 49 of the ferrule 41. The fiber support 50 extends outwardly of the rearward end of the plug shell where it has an annular flange 53 beyond which is a frustoconical portion 54 which, through a radial shoulder 55, connects to an elongated smaller tubular end portion 56. The outer end of the support 50 includes a shallow exterior bevel 57 which facilitates extending the jacket 58 of the fiber bundle 11 over the elongated tubular end portion 56 to bring the end of the jacket against the radial shoulder 55 of the support 50.

The bore through the support includes a beveled entrance 59 at the rearward end, an intermediate portion 60 of relatively smaller diameter that extends most of the length of the support and a forward part 61 of enlarged diameter. The bore section 60 is larger in cross sectorial area than that of the triangular portion 47 of the ferrule, but effectively confines the bundle 11 and gives it support so as to avoid breakage of the fibers 13.

A retainer nut 62 meshes with the threaded rearward end portion 23 of the plug shell 17. The retainer nut includes a radial flange 63 at its rearward end which engages the annular flange 53 of the support 50. Therefore, when the retainer nut 62 is tightened onto the rearward portion 23 of the plug shell, it imposes an axial force on the support 50 which in turn forces the ferrule 41 forward so that its surface 45 firmly engages the inner edge of the flange 28 of the plug shell.

Also included in the plug assembly is a coupling nut 64, somewhat larger than the retainer nut 62, which has a forward portion 65 having internal threads, an unthreaded intermediate portion 66 and a rearward inwardly extending radial flange 67. The circumferential periphery of the coupling nut 63 is knurled to facilitate its manual rotation. The threads of the forward portion 65 are of the same diameter and pitch as the threads on the portion 20 of the plug shell 17 so that the coupling nut can be retained on the plug shell by advancing its threads past the threads of the plug shell portion 20. The latter portion then is received in the unthreaded part 66 of the coupling nut.

The receptacle assembly 15 includes a receptacle shell 68 having a cylindrical bore with a forward portion 69 which is slightly smaller in diameter than the rearward portion 70 of the bore. There is an off-center transverse slot in the forward end of the receptacle shell defined by parallel chordal surfaces 71 and 72 and an inner radial surface 73. The surfaces 71 and 72 of the slot are spaced apart a distance equal to the width of the lugs 36 on the alignment sleeve and the slot is of a depth such that it will receive these lugs when the connector is assembled. A flange 74 is at the upper edge of the forward end portion 69 of the bore and corresponds to the flange 28 of the plug shell 17 in dimension and position.

For its exterior configuration, the receptacle shell 68 includes a short cylindrical forward end portion 75 which is interrupted by the forward transverse slot of the receptacle shell. Inwardly of the portion 75 is a larger threaded section 76 which is adapted to mesh with the forward threaded portion 65 of the coupling nut when the connector is assembled. At the intermediate part of the receptacle shell is an exteriorly enlarged portion 77 having a knurled periphery to facilitate holding the receptacle shell against rotation as the coupling nut 63 is tightened when the connector is mated. At the rearward end of the receptacle shell 68 is a relatively small exteriorly threaded portion 78 which is received in a retainer nut 79 identical to the retainer nut 51.

Within the bore of the receptacle shell 68 is a ferrule 80, which is the same as the ferrule 41 in the plug assembly, and a support 81 that is identical to the support 51 of the plug. The flange 82 of the support 81 is engaged by the flange 83 of the retainer nut so that the ferrule is firmly held in its forward position with the radial surface 84 at its notched upper forward end in contact with the flange 74 of the receptacle shell.

Figure 2:
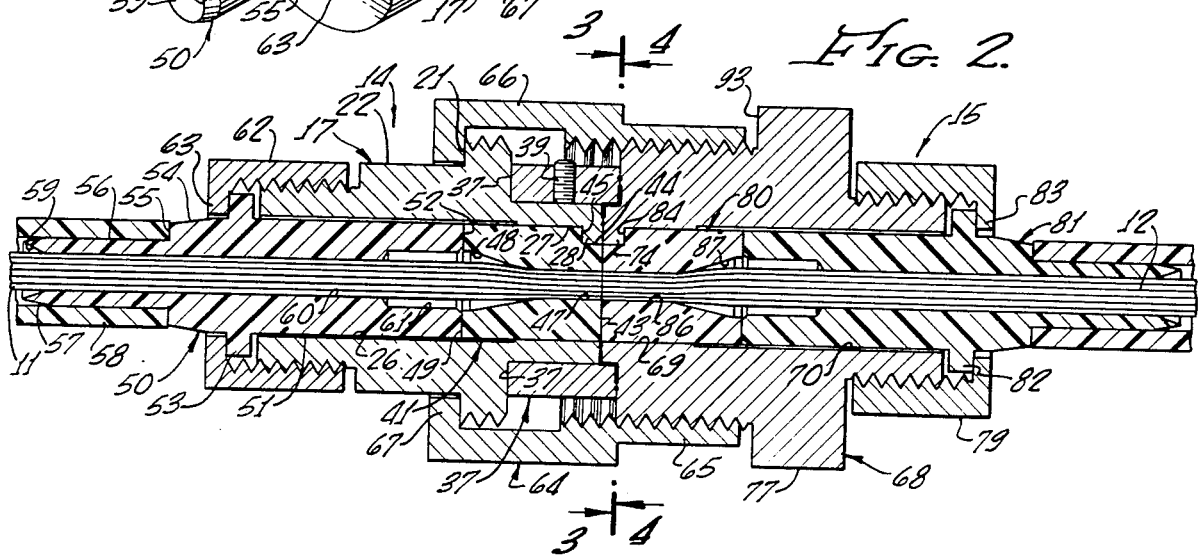
FIG. 2 is a longitudinal sectional view of the connector.
Figure 3:
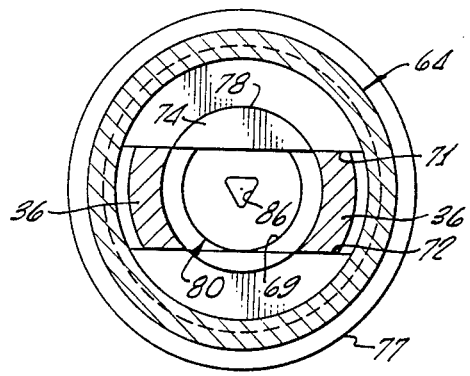
FIG. 3 is a transverse sectional view taken along line 3—3 of FIG. 2.
Figure 4:
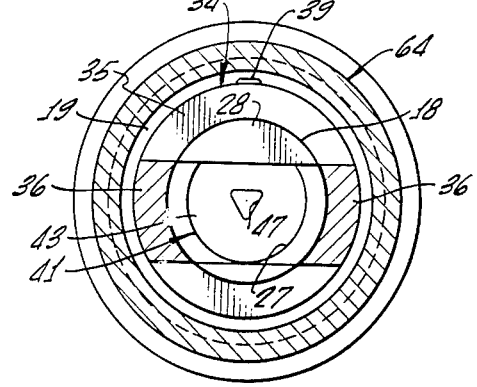
FIG. 4 is a transverse sectional view taken along line 4—4 of FIG. 2.

When the connector is in its mated position as shown in FIG. 2, the plug and receptacle are held together by the coupling nut 63, the forward end 64 of which engages the threaded end 76 of the receptacle shell 68. The forward end of the plug shell 17 engages the forward end of the receptacle shell 68, and the ends of the ferrules and fiber bundles likewise are in abutment. In this position, the lugs 36 of the alignment sleeve 34 enter the slot bounded by the surfaces 71, 72 and 73 at the forward end of the receptacle shell.

The triangular portion 47 of the opening through the ferrule 41 is formed so that it presents a flat surface adjacent and parallel to the transverse surface 44 of the notch at the forward end of the ferrule. The corresponding opening 86 in the other ferrule 80 similarly has a flat surface that is adjacent and parallel to the transverse surface of its forward end notch. The tapered portion 48 of the opening in the ferrule 41 facilitates introduction of the fibers 13 into the constricted triangular portion 47 of the ferrule. There is, of course, a similarly tapered entrance 87 to the triangular opening 86 in the other ferrule 80. Within the triangular openings 47 and 86, the peripheral fibers 13 bear against the flat walls defining the openings, and the corner fibers are wedged against the convergent corner wall surfaces. Within the bundles, adjacent fibers 13 are in abutment. The fibers 13 are bonded together at their forward end portions within the openings 47 and 86.

The triangular openings through the ferrules are proportioned such that each receives a specified number of the glass fibers 13 in their most compact grouping. An opening of equilateral triangular shape can be made to receive certain numbers of glass fibers or other elements of identical circular cross section in such a relationship. In the example shown in FIG. 6, the opening accommodates fifteen such fibers. Hexagonal openings also can be made to receive specific numbers of glass fibers in a compact abutting relationship. Accordingly, the ferrules may be given hexagonal openings through them such as shown in FIG. 7. In the latter example, the opening is dimensioned to receive nineteen fibers 13 in a compact group.

In designing a hexagonal opening for a bundle of fibers the expression $$N = 3n^2 - 3n + 1$$

may be used, where N is the total number of fibers and $n$ is the number of fibers on each flat surface of the hexagon. The length A of each flat hexagon surface is found by the formula $$A = [3n + (\sqrt{3} - 1)] d,$$

in which $d$ is the fiber diameter. The number of fibers at each flat surface is expressed as $$n = \frac{A}{\sqrt{3}\, d} - \left( \frac{\sqrt{3} - 1}{\sqrt{3}} \right).$$

In a hexagon, some values of $n$ cannot be used to produce a compact grouping.

The dimensions of a triangular opening may be found from the following formulas:

$$\alpha = \frac{n-1}{2}$$

$$D = 2 \left[ \frac{2\alpha}{\sqrt{3}} + \frac{1}{2} + \frac{1}{10} \right] d$$

$$A' = \left( \sqrt{3}\alpha + 1.1 \right) d$$

$$f = \frac{d}{2} - \frac{d}{10} = .4d.$$

In these expressions, D is the diameter of a circle on which fall the surfaces of the truncated tips of the triangle, A' is the height of the figure and $f$ is the length of the tip surface (see FIG. 8). When the opening is triangular, $n$ may be any whole number. A clearance of $(1/10)\, d$ between the fiber and the top surface is selected to assure that the corner fibers will bear against the converging surfaces of the triangle and not the tip surfaces. The provision of tip surfaces of finite dimension is for ease of manufacture and to avoid stress concentrations, because otherwise the opening may be made exactly triangular.

Whenever the fibers enter an appropriately designed opening, they are caused to assume the same positions. Therefore, the fibers 13 of the bundle 11 that extend into the ferrule 41 have exactly the same positions as the fibers 13 of the bundle 12 that extend into the other ferrule 80. Accordingly, by rotationally positioning the plug and receptacle to have the same orientation of the triangular openings 47 and 86, there is very nearly exact axial alignment of the individual fibers of the bundles 11 and 12.

It is important to minimize light attenuation at the connector for which reason the ferrules are made rotationally adjustable to accomplish precise fiber alignment. This is achieved by the adjustment sleeve 34 which can be turned relative to the plug shell 17, thereby causing the receptacle shell 68 to rotate with it because of the presence of the lugs 36 in the slot at the forward end of the receptacle shell. Therefore, in setting the coupling to minimze light losses, it is first given a rotational adjustment of the plug and receptacle which is expected to align the openings 47 and 86 and hence the fibers within them. The light transmission through the connector then is measured by an arrangement such as shown in FIG. 9. A source of light 88 of known intensity is positioned so as to direct light through one of the optical fiber bundles extending to the connector (such as the bundle 11 as illustrated) toward the other. A suitable photometer 89 indicates the intensity of the light after it has passed through the connector and through a length of the other bundle 12 equal to that of the bundle 11. The readout value subtracted from the intensity of the source 88 gives a measure of the attenuation at the connector. If the attenuation is of a value exceeding acceptable limits, it is known that there is too much misalignment of the individual fibers of the two bundles. The sleeve 34 then is rotated on the plug shell 17 to turn the receptacle shell 68 with it and thereby cause rotation of the fiber bundle 12 relative to the bundle 11. Again, the light transmission is measured to ascertain the loss at the connector. If necessary, further rotational adjustments of the receptacle relative to the plug can be made in order to obtain attenuation within acceptable limits. When the proper setting has been made, the set screw 39 is tightened to rotationally lock the sleeve 34 on the plug shell 17. This retains the setting even upon repeated mating and unmating of the connector.

In addition, to most efficiently transmit light through the connector, the end faces of the fibers 13 should be perpendicular to their axes and brought substantially into abutment within the connector. Therefore, provision is made to dress the end surfaces of the fiber bundles 11 and 12 to accomplish this. This is done after the fiber bundles have been assembled into the plug and receptacle so that the positions of the fibers are not disturbed after the finishing operation. The finishing of the ends of the fiber bundles also finishes the ends of the ferrules and the plug and receptacle shells so that each connector section has a flat end face, perpendicular to its axis. Because of this, the ends of the plug and receptacle shells engage each other as the ends of the fiber bundles are brought into abutment, and the major compression loads imposed by the coupling nut 64 are absorbed by the metal shells instead of being imparted to the optical fibers.

A disc 90 of hardened material, having a threaded opening 91 through it, provides a fixture for finishing the bundle 12 of the receptacle 15. This opening is made exactly perpendicular to the forward end face 92 of the disc. The forward threaded end 76 of the receptacle shell 68 is meshed with the threads of the opening 91 and advanced into the opening until the shoulder 93 of the receptacle on the forward side of the enlarged knurled portion 77 bears against the rearward radial face 94 of the disc 90. The axial length of the disc 90 is proportioned so that when the receptacle is in this position the forward end 43 of the ferrule 41 and the ends of the fibers 13 of the bundle 11, as well as the forward end of the receptacle shell 68, project very slightly forwardly of the end surface 92 of the disc (see FIG. 12). The disc 90 then is moved toward a polishing surface 95 until the forward end face 92 of the disc reaches the polishing surface. This polishes the ends of the bundle 12, ferrule 41 and the receptacle shell 68 so that they are flush and are perpendicular to the axis of the receptacle (see FIG. 13). Also, the finished end of the receptacle is spaced a predetermined distance from the shoulder 93.

For the plug the finishing fixture includes a disc 96 having an opening that has a forward portion 97 of relatively small diameter connected through the radial shoulder 98 to a rearward portion 99 that is of larger diameter and threaded. The forward portion 18 of the plug shell fits into the forward portion 97 of the opening in the disc 96, with the radial shoulder 19 of the plug shell engaging the surface 98 of the disc 96. Threaded into the rearward portion 99 of the opening in the disc 96 is a member 100 which has an opening 101 dimensioned to complementarily receive the intermediate circumferential surface 22 of the plug shell. The forward end 102 of the member 100 bears against the shoulder 21 of the plug shell forcing the surfaces 19 and 98 together. When so held, the ends of the plug shell 17, the ferrule 41 and the fiber bundle 11 project beyond the radial forward face 103 of the disc 96. The disc 96 then is advanced toward a polishing surface 104 until the disc and face 103 engages the surface 104. This dresses the ends of the ferrule 41, the bundle of fibers 11 and the plug shell 17 in the same manner as for the receptacle.

The foregoing detailed description is to be clearly understood as given by way of illustration and example only, the spirit and scope of this invention being limited solely by the appended claims.

We claim:

1. A connector for optical waveguides comprising
a first means,
a second means,
a first bundle of a plurality of discrete optical fibers,
a second bundle of a plurality of discrete optical fibers,
  said first means having an opening of predetermined size and shape, dimensioned and proportioned to receive a predetermined number of said fibers in abutting relationship with said fibers in predetermined positions in said opening,
  said second means having an opening of the same size and shape as said opening in said first means,
  each of said bundles of discrete optical fibers containing said predetermined number of fibers, said first bundle of discrete optical fibers being received in said opening in said first means, said second bundle of discrete optical fibers being received in said opening in said second means,
  connecting means for connecting said first and second means together with said first and second bundles of discrete optical fibers substantially in end-to-end alignment,
  adjustable means for rotationally positioning said first means relative to said second means for adjusting said first bundle of discrete optical fibers relative to said second bundle of discrete optical fibers for minimizing light attenuation therebetween,
    said adjustable means including an element rotatable about a portion of said first means,
      said portion of said first means having a cylindrical surface, said element being a sleeve circumscribing said surface, and having projecting portions engaging said second means for coupling said element to said second means for rotation therewith, said second means having slot means therein, said projecting portions of said sleeve including lugs received in said slot means, and means for selectively locking said element to said first means for preventing said element from rotating relative to said first means.

2. A device as recited in claim 1 in which said sleeve has a radial threaded opening therethrough, and said locking means is a set screw received in said opening.

3. A connector for optical waveguides comprising a first means, a second means, a first bundle of a plurality of discrete optical fibers, a second bundle of a plurality of discrete optical fibers, said first means having an opening of predetermined size and shape, dimensioned and proportioned to receive a predetermined number of said fibers in abutting relationship with said fibers in predetermined positions in said opening, said second means having an opening of the same size and shape as said opening in said first means, each of said bundles of discrete optical fibers containing said predetermined number of fibers, said first bundle of discrete optical fibers being received in said opening in said first means, said second bundle of discrete optical fibers being received in said opening in said second means, connecting means for connecting said first and second means together with said first and second bundles of discrete optical fibers substantially in end-to-end alignment, adjustable means for rotationally positioning said first means relative to said second means for adjusting said first bundle of discrete optical fibers relative to said second bundle of discrete optical fibers of minimizing light attenuation therebetween, each of said first and second means including an outer member having a bore therethrough, and an inner member received in said bore, said inner members defining said openings of predetermined size and shape, said outer and inner members having cooperating means for preventing relative rotation therebetween, each of said outer members having a flange extending across a portion of the forward end of the bore thereof, each of said inner members having a notch receiving the flange of the outer member therefor and engaging said outer member at said flange, whereby said flange of each of said outer members prevents the inner member therein from moving forwardly and from rotating relative thereto.

4. A connector for optical waveguides comprising a first means, a second means, a first bundle of a plurality of discrete optical fibers, a second bundle of a plurality of discrete optical fibers, said first means having an opening of predetermined size and shape, dimensioned and proportioned to receive a predetermined number of said fibers in abutting relationship with said fibers in predetermined positions in said opening, said second means having an opening of the same size and shape as said opening in said first means, each of said bundles of discrete optical fibers containing said predetermined number of fibers, said first bundle of discrete optical fibers being received in said opening in said first means, said second bundle of discrete optical fibers being received in said opening in said second means, connecting means for connecting said first and second means together with said first and second bundles of discrete optical fibers substantially in end-to-end alignment, adjustable means for rotationally positioning said first means relative to said second means for adjusting said first bundle of discrete optical fibers relative to said second bundle of discrete optical fibers for minimizing light attenuation therebetween, each of said first and second means including an outer member having a bore therethrough, and an inner member received in said bore, said inner members defining said openings of predetermined size and shape, said outer and inner members having cooperating means for preventing relative rotation therebetween, and a nut threadably engaging the rearward portion of said outer member thereof, each of said nuts having abutment means for preventing said inner member from moving rearwardly relative to said outer member.

* * * * *